United States Patent
Ogawa (10) Patent No.: US 8,156,260 B2
(45) Date of Patent: Apr. 10, 2012

(54) DATA TRANSFER DEVICE AND METHOD FOR SELECTING INSTRUCTIONS RETAINED IN CHANNEL UNIT BASED ON DETERMINED PRIORITIES DUE TO THE NUMBER OF WAITING COMMANDS/INSTRUCTIONS

(75) Inventor: Yuichi Ogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 235 days.

(21) Appl. No.: 12/502,573

(22) Filed: Jul. 14, 2009

(65) Prior Publication Data

US 2010/0042756 A1 Feb. 18, 2010

(30) Foreign Application Priority Data

Aug. 14, 2008 (JP) .................................. 2008-209032

(51) Int. Cl.
*G06F 3/00* (2006.01)
*G06F 13/36* (2006.01)
(52) U.S. Cl. ............. 710/28; 710/22; 710/306; 710/309
(58) Field of Classification Search ...................... 710/28
See application file for complete search history.

(56) References Cited

U.S. PATENT DOCUMENTS

| 2004/0230742 A1* | 11/2004 | Ikeuchi et al. ................ 711/112 |
| 2005/0030971 A1* | 2/2005 | Yuan .............................. 370/462 |
| 2006/0053236 A1* | 3/2006 | Sonksen et al. ................. 710/22 |
| 2007/0220193 A1* | 9/2007 | Ikeda et al. .................... 710/309 |

FOREIGN PATENT DOCUMENTS

| JP | 05-342142 A | 12/1993 |
| JP | 2002-229934 A | 8/2002 |
| JP | 2002-366507 A | 12/2002 |

* cited by examiner

*Primary Examiner* — Chun Kuan Lee
*Assistant Examiner* — Brooke Dews
(74) *Attorney, Agent, or Firm* — Fujitsu Patent Center (57) ABSTRACT

A data transfer device for performing direct memory access (DMA) transfer of data stored in a storage unit to a plurality of other devices includes: a plurality of channel units arranged to correspond to the other devices, the channel units retaining DMA transfer instructions, and outputting number of the DMA transfer instructions retained; a plurality of priority controllers for determining priorities of the channel units on the basis of the number of the DMA transfer instructions retained in the channel units, respectively; an arbiter for selecting one of the DMA transfer instructions retained in one of the channel units on the basis of the priorities determined by the priority controller; and a data transfer processor for performing DMA transfer of data stored in the storage unit to one of the other devices in accordance with the DMA transfer instruction selected by the arbiter.

8 Claims, 10 Drawing Sheets

| POINTER VALUE (900) | PRIORITY (902) |
|---|---|
| 0 | HIGH LEVEL |
| 1 | MEDIUM LEVEL |
| 2 | HIGH LEVEL |
| 3 | MEDIUM LEVEL |
| 4 | HIGH LEVEL |
| 5 | LOW LEVEL |
| 6 | HIGH LEVEL |
| 7 | MEDIUM LEVEL |
| 8 | HIGH LEVEL |

904 → row with pointer 0
907 → row with pointer 1
908 → row with pointer 5
906 → row with pointer 8

FIG. 10

DATA TRANSFER DEVICE AND METHOD FOR SELECTING INSTRUCTIONS RETAINED IN CHANNEL UNIT BASED ON DETERMINED PRIORITIES DUE TO THE NUMBER OF WAITING COMMANDS/INSTRUCTIONS

CROSS-REFERENCE TO RELATED APPLICATIONS

This application is based upon and claims the benefit of priority of the prior Japanese Patent Application No. 2008-209032 filed on Aug. 14, 2008, the entire contents of which are incorporated herein by reference.

FIELD

The embodiments discussed herein are related to a data transfer device.

BACKGROUND

Data transfer between a plurality of storage units such as memories and magnetic disks is performed by data transfer devices connected to respective storage units. In order to process the data transfer between the data transfer devices at high speed, each data transfer device performs data transfer processing directly to the other data transfer devices without the intervention of a controller such as a CPU (Central Processing Unit). Such processing is commonly known as a direct memory access (DMA) transfer processing.

Each data transfer device includes channel units corresponding to respective devices of data transfer destinations. When there is a demand for data transfer from other devices such as external servers, the channel unit corresponding to the respective devices of the data transfer destinations retains a command which is a DMA transfer instruction outputted from the controller. When each channel unit retains one or more command, a demand signal for demanding that the data transfer processor for executing DMA transfer processing executes a command is outputted. When the demand signal is received, the data transfer processor executes the command retained in the channel unit which outputted the demand signal.

When the data transfer device performs data transfer with a plurality of devices, a plurality of the channel units share one data transfer processor. The data transfer processor may execute only one command at one time. Therefore, when a plurality of the channel units output a plurality of demand signals simultaneously, the data transfer processor is required to select one of them and execute it. A device that is input with a plurality of commands from the controller, selects one command according to a specific arbitrating condition and makes the data transfer processor execute the command is called an arbitration device.

According to processing performed by the arbitration device, it may occur that a command is not executed for a long period of time while being retained in the channel unit. If an execution standby time of a command exceeds a certain constant value, the command is timed out and a data transfer error occurs. Technologies of arbitrating order of execution of commands in accordance with execution standby time of the commands in order to avoid such time-outs are disclosed in Japanese Laid-open Patent Publication No. 2002-366507, Japanese Laid-open Patent Publication No. 2002-229934, and Japanese Laid-open Patent Publication No. 05-342142.

SUMMARY

According to an aspect of the embodiment, a data transfer device for performing direct memory access transfer of data stored in a storage unit to a plurality of other devices includes: a plurality of channel units arranged to correspond to the other devices, the channel units retaining direct memory access transfer instructions, and outputting number of the direct memory access transfer instructions retained; a plurality of priority controllers for determining priorities of the channel units on the basis of the number of the v transfer instructions retained in the channel units, respectively; an arbiter for selecting one of the direct memory access transfer instructions retained in one of the channel units on the basis of the priorities determined by the priority controller; and a data transfer processor for performing direct memory access transfer of data stored in the storage unit to one of the other devices in accordance with the direct memory access transfer instruction selected by the arbiter.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
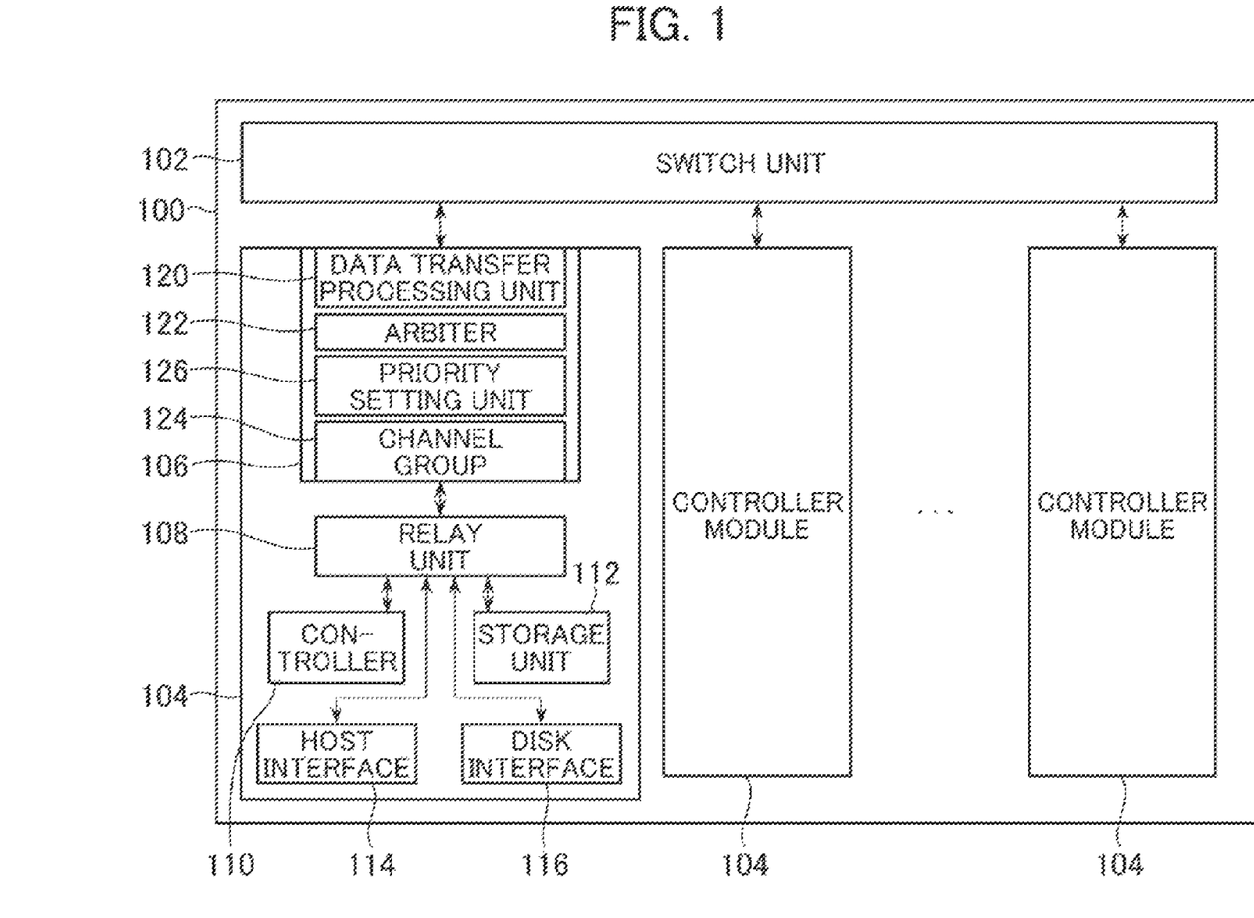
FIG. 1 illustrates a block diagram of a data control device.

FIG. 1 is a block diagram of a data control device 100. The data control device 100 includes a plurality s of controller modules 104 and a switch unit 102. Also, in FIG. 1, a block diagram of inside of one of the plurality of controller modules 104 is shown in detail.

The switch unit 102 is a data transfer route between the plurality of the controller modules 104. Each controller module 104 includes a data transfer device 106, a relay unit 108, a controller 110, a storage unit 112, a host interface 114, and a disk interface 116 respectively.

The data transfer device 106 executes data transfer processing for the other controller modules 104. The data transfer device 106 performs data transfer processing by the DMA transfer method for example, and performs direct transfer of data with the storage unit 112 and other controller modules 104 without involvement of the controller 110. The data transfer device 106 includes a data transfer processing group 120, an arbiter 122, a priority setting group 126, and a channel group 124.

The data transfer processing group 120 executes the DMA transfer instructions for the data transfer processing groups 120 arranged in other controller modules 104. The channel group 124 counts the number of data transfer instructions, which are the DMA transfer instructions for the other controller modules 104, for each of the controller modules 104 of the destinations of the data transfer. The priority setting group 126 set the order of priority of the data transfer commands on the basis of the number of data transfer commands. The arbiter 122 selects a data transfer command on the basis of the order of priority set and transmits the selected data transfer command to the data transfer processing group 120. By selecting the command to be executed on the basis of the number of data transfer commands, the commands of the channel group 124 with many commands are processed with priority. Thus, the data control devices 100 may prevent the time-out of the data transfer commands written in respective controller modules 104.

The controller 110 is a central processing unit (CPU) for example and controls the controller modules 104 in a unified manner. The storage unit 112 is a memory such as a read only memory (ROM) or a random access memory (RAM) and stores a variety of data transmitted from an external server (not shown) and data transfer commands issued by the controller 110. The relay unit 108 is a memory controller hub (MCH) for example and relays signal transmissions between the controller 110, storage unit 112, and data transfer device 106.

The host interface 114 is connected to the external server (not shown). The external server performs instructions such as writing and reading of data to and from the controller module 104 through the host interface 114. The disk interface 116 is connected to a magnetic disk device and RAID device (not shown). Each controller module 104 performs writing and reading of data with the magnetic disk device or the like through the disk interface 116.

Figure 2:
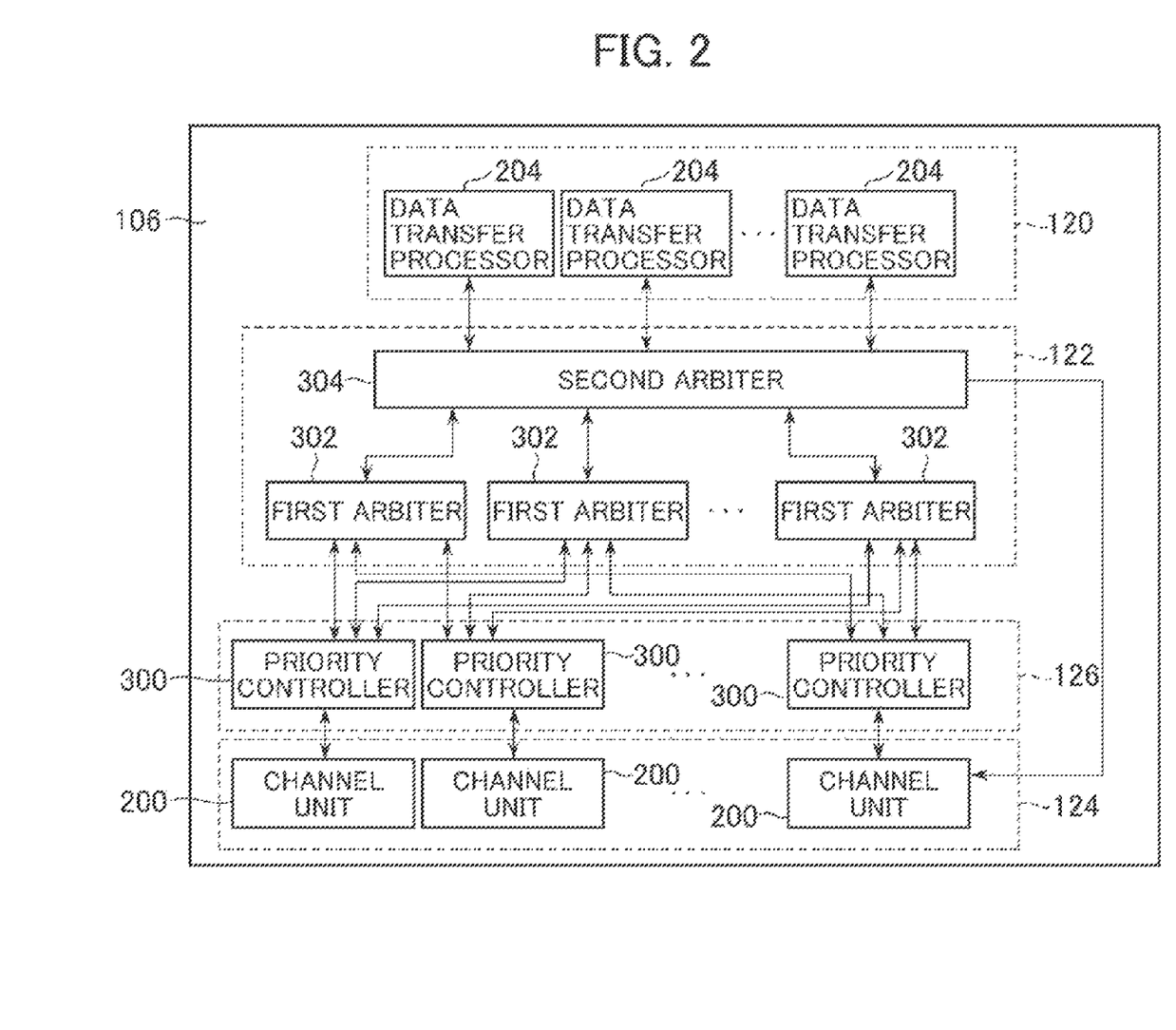
FIG. 2 illustrates a block diagram of a data transfer device.

FIG. 2 is a block diagram of the data transfer device 106. As described above, the data transfer device 106 includes a data transfer processing group 120, an arbiter 122, a priority setting group 126, and a channel group 124. The priority setting group 126 includes a plurality n of priority controllers 300. The channel group 124 includes n channel units 200.

The data transfer processing group 120 includes a plurality m of data transfer processors 204. The data transfer processors 204 respectively independently execute the data transfer commands transmitted from the arbiter 122. Here, m is smaller than n.

The arbiter 122 includes a plurality k of first arbiters 302. Also, the arbiter 122 includes a second arbiter 304.

The channel unit 200 adds the address of the storage unit 112 (not shown) storing the commands in accordance with the number of commands transmitted from the controller 110. The channel unit 200 retains the number of commands transmitted from the controller 110 (not shown) in accordance with the controller modules 104 of the destinations of data transfer. Also, when the number of the commands retained is one or more, the channel unit 200 issues a demand for execution of the commands corresponding to the channel unit. More specifically, the channel unit 200 outputs a demand signal 212, an address signal 213 showing the addresses where the commands are stored, and a command number signal 214 showing the number of commands retained in the channel unit 200 (not shown) to the priority controller 300. The demand signal 212, address signal 213 and command number signal 214 will be described later.

The priority controller 300 sets the priority of the demand signal 212 in accordance with the command number signal 214 outputted by the channel unit 200. The priority controllers 300 are each provided for a respective channel unit 200. The priority controller 300 may be provided so as to perform part of the function of the respective channel unit 200. The priority controller 300 outputs the demand signal 212 to the first arbiter 302 corresponding to the set priority. Here, the number of first arbiters 302 k is equal to the set number of priority arranged in the priority controller 300. The priority controller 300 branches and outputs the address signal 213 to all first arbiters 302.

The first arbiter 302 is a round robin type arbitration circuit. The round robin type first arbitration circuit 302 selects the demand signal 212 outputted from the plurality of priority controllers 300 in order for each channel. The first arbiter 302 selects one out of a plurality of the demand signals 212 having the same priority outputted by the priority controller 300, and outputs it to a second arbiter 304. Also, the first arbiter 302 outputs the address signal 213, a channel number 318 corresponding to the selected demand signal 212. The channel number 318 will be described later.

The second arbiter 304 selects one demand signal 212 and one address signal 213 on the basis of the priority set in the second arbiter 304 out of the demand signals 212 and address signals 213 respectively outputted from the k first arbiters 302. Also, the second arbiter 304 outputs the demand signal 212 and the address signal 213 to any one of the data transfer processors 204 which are not currently executing data transfer processing. Which priority is to be selected is decided by using a priority table 804 to be described later. The priority table 804 is set so that demands demanded by the channel units 200 with high priorities have higher probabilities of being selected. By selecting with high priority the demand demanded by the channel unit 200 with high priority, the number of commands accumulated in any of the channel units 200 may be prevented from becoming excessively large. Thus, time-out of commands whose execution is demanded by the channel units 200 may be prevented.

The data transfer processor 204 which received the demand signal 212 refers to the storage unit 112 (not shown) on the basis of the address signal 213 inputted, and obtains the command corresponding to the address signal 213 from the storage unit 112. The data transfer processor 204 executes the data transfer processing for the controller module 104 of the destination of the data transfer on the basis of the command corresponding to the address signal 213. The data transfer processor 204 outputs a state signal 218, an end signal 220 (not shown) to the second arbiter 304 after executing the command.

When the state signal 218 and end signal 220 outputted by the data transfer processor 204 are received, the second arbiter 304 refers to the channel number 318 stored in a channel register 806 described later. On the basis of the channel number 318 referred to, the second arbiter 304 outputs a state signal 412 and an end signal 420 to each channel unit 200 corresponding to the demand signal 216. When the end signal 420 is received, the channel unit 200 outputs an interruption signal 222 to the controller 110. Thus, the channel unit 200 may notify the controller 110 that the data transfer processing has finished. Consequently, according to the data transfer device of the present embodiment, the order of execution of the commands may be arbitrated in accordance with the number of commands retained in each channel unit 200 and occurrence of time-out may be prevented.

Figure 3:
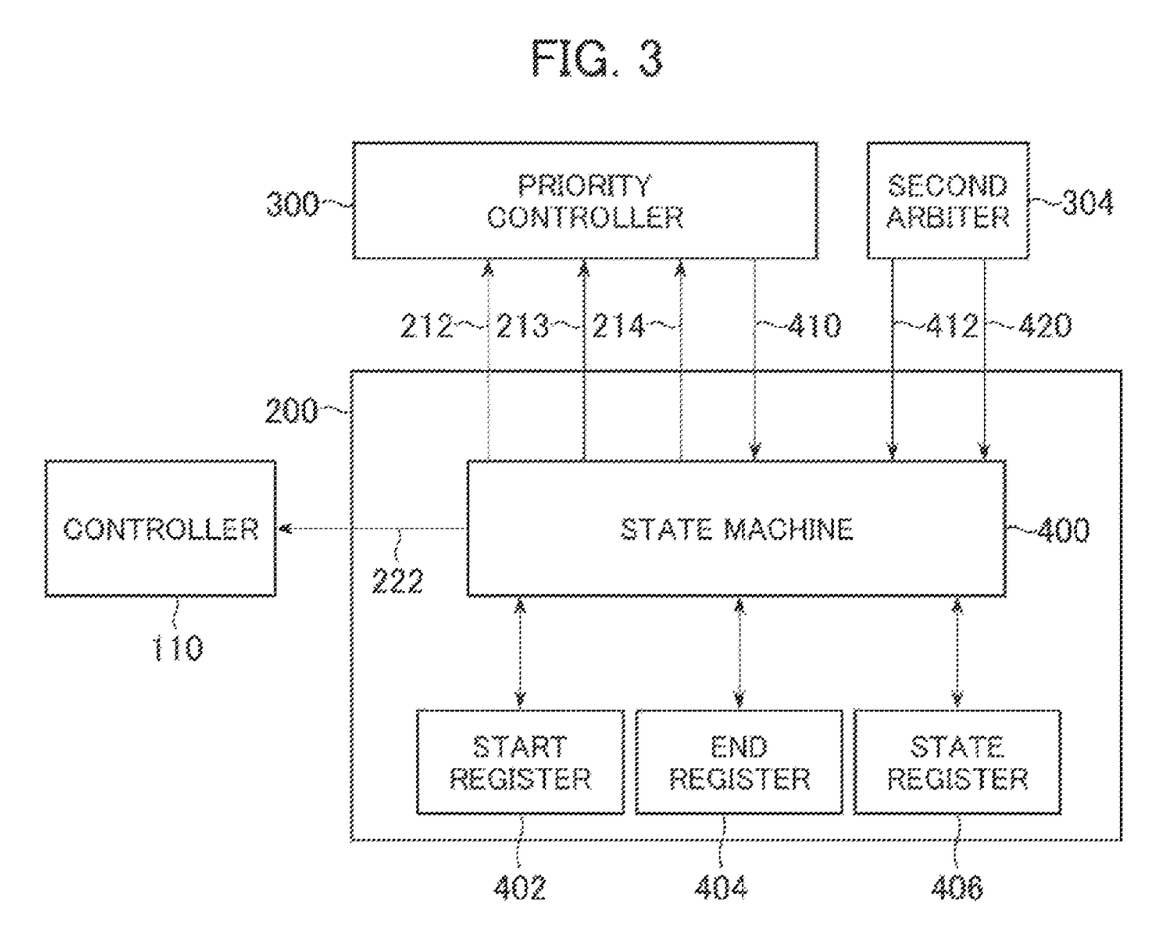
FIG. 3 illustrates a block diagram of a channel unit.

FIG. 3 is a detailed block diagram of the channel unit 200. Each channel unit 200 includes a state machine 400, a start register 402, an end register 404, and a state register 406.

The entity of the command corresponding to the address signal 213 outputted by the channel unit 200 is stored in the storage unit 112 (not shown). In the present embodiment, the body of the command is stored in the continuous address space in the storage unit 112. Therefore, the number of stored commands may be obtained from the start address and the end address of the storage region.

The start register 402 stores the start address of a command group stored in the storage unit 112. The end register 404 stores the end address of a command group stored in the storage unit 112. By incrementing the end register 404 each time a command is written in the storage unit 112 from the controller 110, the number of commands stored in the storage unit 112 may be obtained. Further, it is also possible to separately provide a counter for counting the number of commands and to increment the number each time a command is written in the storage unit 112. Thus, the number of commands stored in the storage unit 112 may be obtained without computation by using the start address and the end address of the storage region.

The state machine 400 computes the difference between the address value retained in the start register 402 and the end register 404, and if the difference is not "0", outputs the demand signal 212, address signal 213 and command number signal 214 to the priority controller 300. When the state machine 400 receives an acknowledgment signal 410 showing that the demand signal 212 has been accepted from any of the priority controllers 300, it stops the output of the demand signal 212. By stopping the output of the demand signal 212 when the acknowledgment signal 410 is received, the state machine 400 may stop the demand of execution of a command from a channel in which execution of a command has not yet finished and avoid the overlapping execution of commands for the same channel. By avoiding overlapping execution, execution of commands may be prevented from being biased to a specific channel.

The state machine 400 receives the end signal 420 showing that the data transfer processing in the data transfer processor 204 (not shown) has finished and the state signal 412 showing the result of the processing from the second arbiter 304. The state machine 400 which received the end signal 420 and the state signal 412 adds the address of the start register 402 and makes the state register 406 retain the state signal 412. After adding the address of the start register 402, the state machine 400 computes the difference between the address values retained in the start register 402 and the end register 404. If the difference is not "0", the state machine 400 outputs the demand signal 212, the address signal 213 and the command number signal 214 again.

The state machine 400 outputs the interruption signal 222 to the controller 110. The controller 110 refers to the state signal 412 retained in the state register 406 and confirms the result of the data transfer processing performed by the data transfer processor 204.

Figure 4:
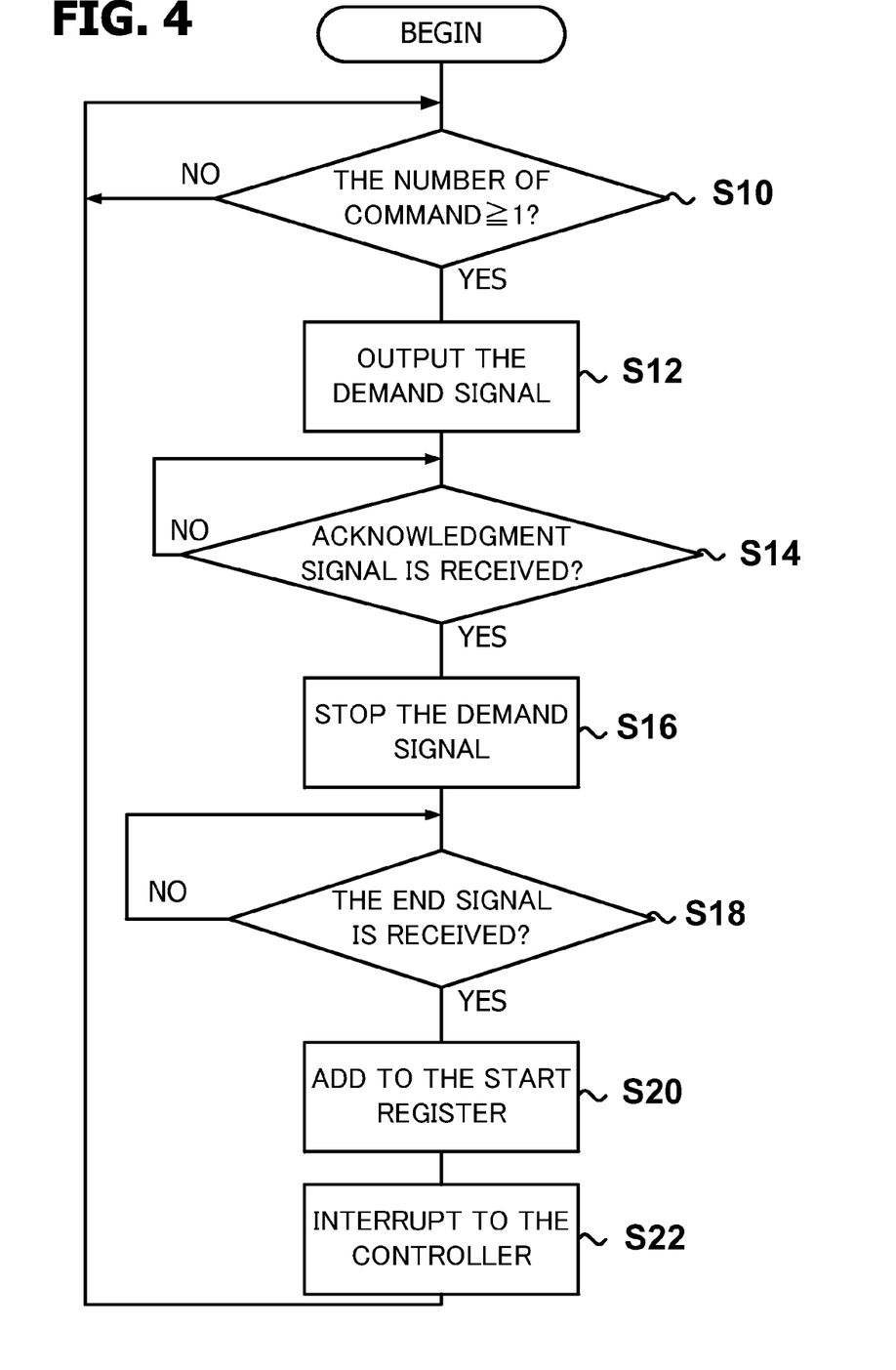
FIG. 4 illustrates an operation flowchart of a state machine.

FIG. 4 is an operation flowchart of the state machine 400.

The state machine 400 refers to the start register 402 and the end register 404, and if the difference between the start address and the end address is one or more, that is, the number of command is one or more (S10: YES), it outputs the demand signal 212 to the priority controller 300 (S12). If the difference between the start address and the end address is smaller than 1 (S10: NO), there is no command to be executed and therefore the demand signal 212 is not outputted.

Although the state machine 400 continues to output the demand signal 212 until the acknowledgment signal 410 outputted by the priority controller 300 is received (S14: NO), when the acknowledgment signal 410 is received (S14: YES), it stops output of the demand signal 212 (S16).

Although the state machine 400 stops operation until the end signal 420 is received from the second arbiter 304 (S18: NO), when the end signal 420 is received (S18: YES), it adds 1 to the start register 402 (S20), outputs the interruption signal 222 to the controller 110 (S22), and executes the processing from the step S10 again.

Figure 5:
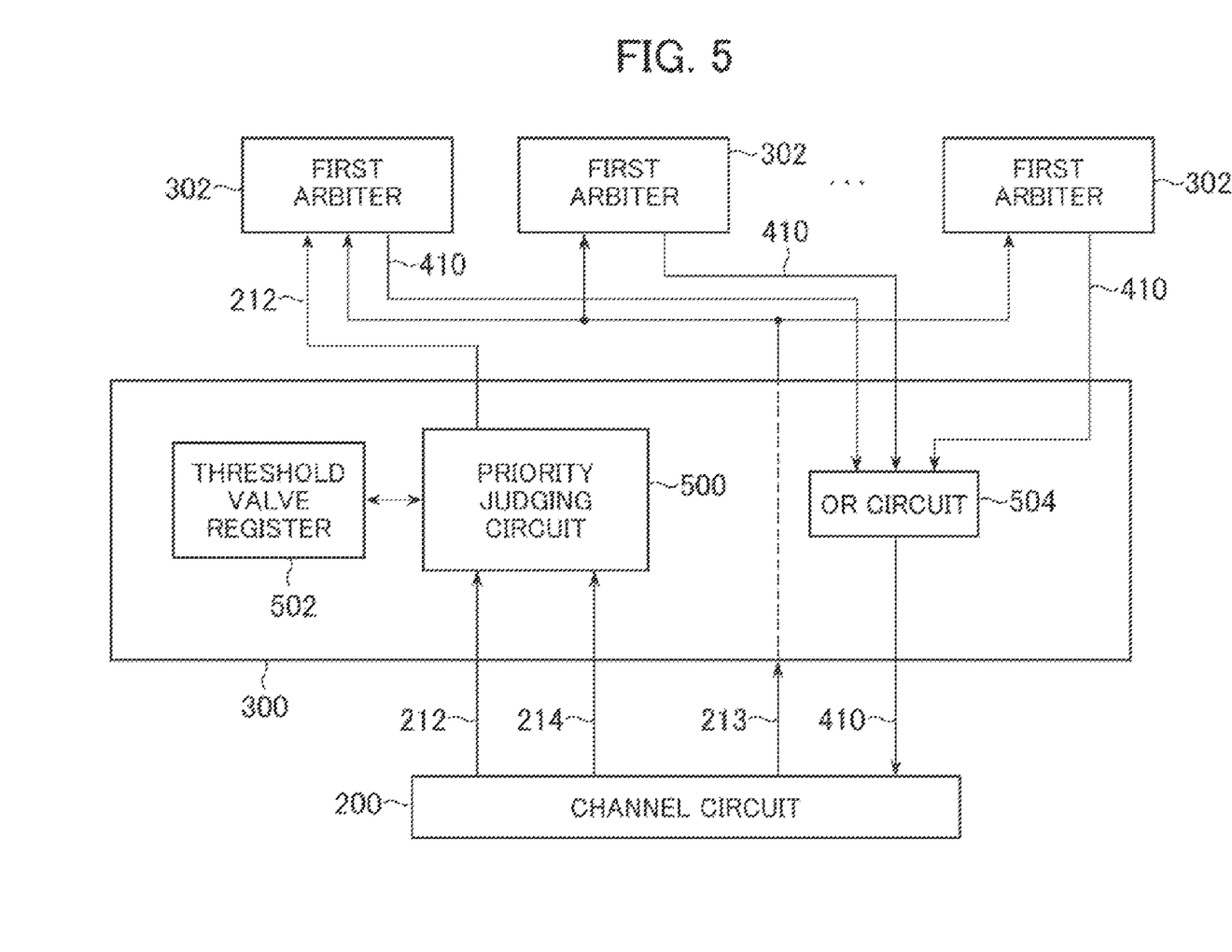
FIG. 5 illustrates a block diagram of a priority controller.

FIG. 5 is a block diagram of the priority controller 300. The priority controller 300 includes a priority judging circuit 500, a threshold value register 502, and an OR circuit 504.

The demand signal 212 and the command number signal 214 outputted by the channel unit 200 are inputted to the priority judging circuit 500. The priority judging circuit 500 starts the priority judging operation for judging the priority of the demand signal 212, in accordance with command number signal 214. The threshold value register 502 stores the threshold value required for judgment of priority. The threshold value of the threshold value register 502 may be rewritten from outside each priority controller 300. By enabling rewriting of the threshold value of the threshold value register 502 from the outside, the threshold value may be optimized in accordance with the arbitration operation. Although the threshold value register 502 is provided in each priority controller 300 in the present embodiment, one register common to all priority controllers 300 may also be provided.

The priority judging circuit 500 compares the command number signal 214 and the threshold value stored in the threshold value register 502 and sets the priority of the demand signal 212. The priority judging circuit 500 outputs the demand signal 212 to the first arbiter 302 (not shown) corresponding to the set priority. In the present embodiment, there are three first arbiters 302 corresponding to high level, medium level, and low level.

The address signal 213 inputted to the priority controller 300 is branched and outputted to each first arbiter 302. Also, the acknowledgment signal 410 outputted from each first arbiter 302 is inputted to the OR circuit 504. When the OR circuit 504 receives any of the acknowledgment signals 410, it outputs the acknowledgment signal 410.

Figure 6:
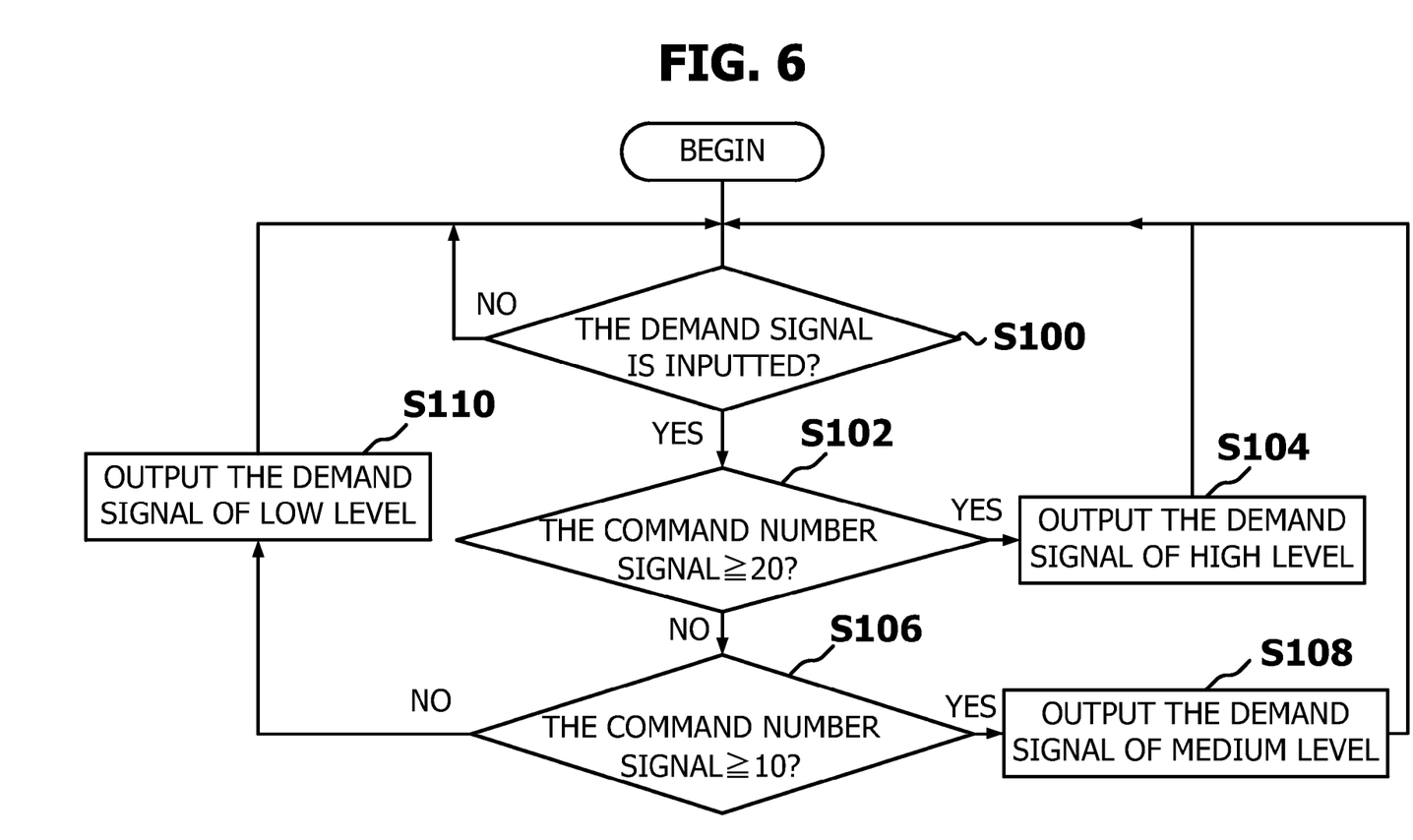
FIG. 6 illustrates an operation flowchart of a priority judging circuit.

FIG. 6 is an operation flowchart of the priority judging circuit 500. In the present embodiment, the priority judging circuit 500 sets the demand signal 212 inputted at any one of the three priority level. Also, the threshold value register 502 stores "20" as the judgment value of the high level, and "10" as the judgment value of the medium level. The priority judging circuit 500 outputs a demand signal of high, medium or low level in accordance with the judgment level to the first arbiter 302.

The priority judging circuit 500 is in a waiting state when the demand signal 212 has not been inputted (S100: NO), and starts judging operation when the demand signal 212 is inputted (S100: YES). For example, when the theoretical value is "0", the demand signal 212 is judged not to have been inputted, and when the theoretical value is "1", the demand signal 212 is judged to have been inputted.

The priority judging circuit 500 compares the inputted command number signal 214 and the threshold value stored in the threshold value register 502. When the command number signal 214 is larger than the threshold value "20" (S102: YES), the demand signal 212 is outputted to the first arbiter 302 of high level (S104). When the command number signal 214 is smaller than the threshold value "20" (S102: NO), the step S106 is executed.

When the inputted command number signal 214 is larger than the threshold value "10" (S106: YES), the priority judging circuit 500 outputs the demand signal 212 to the first arbiter 302 of medium level (S108). On the other hand, when the command number signal 214 is smaller than the threshold value "10" (S106: NO), the demand signal 212 is outputted to the first arbiter 302 of low level (S110).

As described above, the priority judging circuit 500 may output the demand signal 212 to any one of the first arbiters 302 corresponding to the priority selected in accordance with the demand signal 212 and the inputted command number signal 214.

Figure 7:
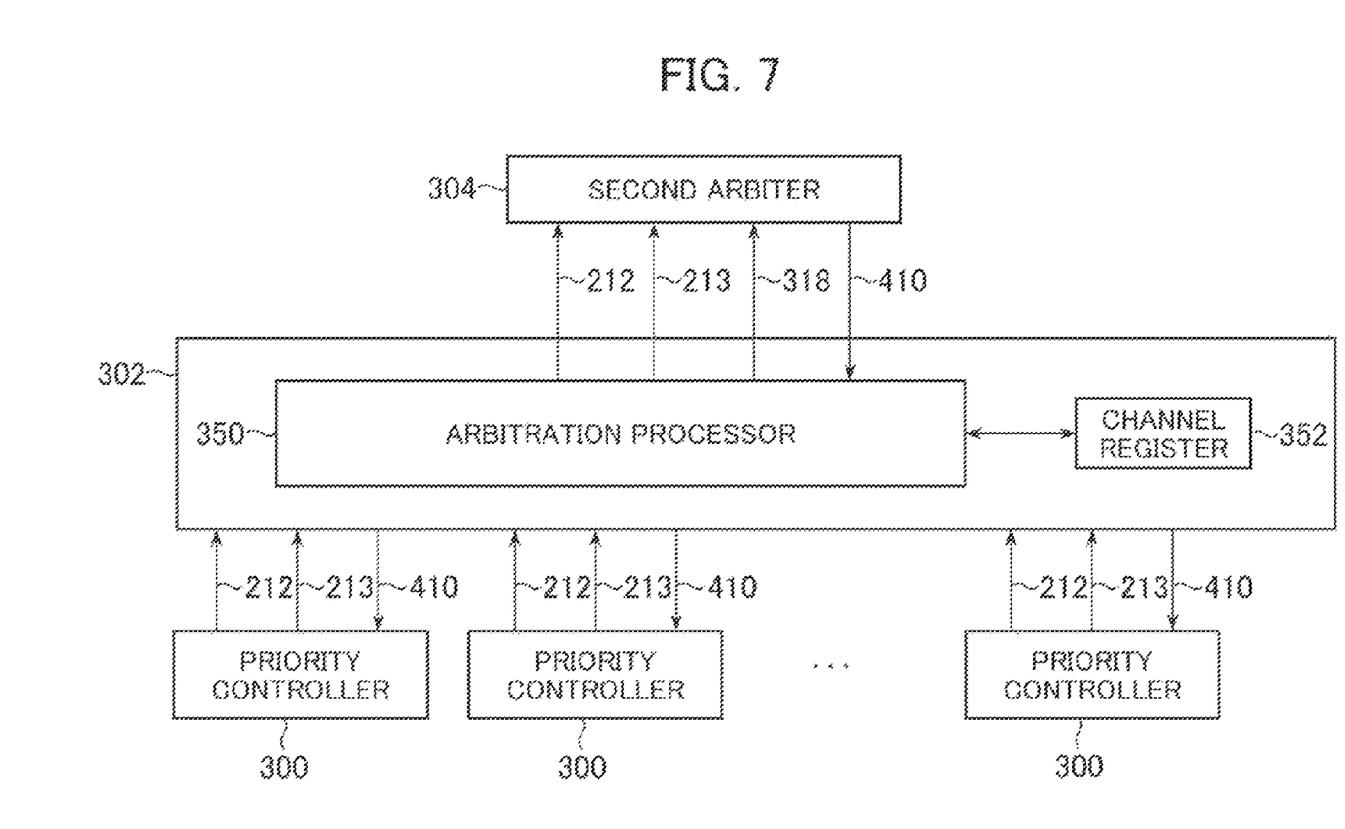
FIG. 7 illustrates a block diagram of a first arbiter.

FIG. 7 is a block diagram of each first arbiter 302. The first arbiter 302 includes an arbitration processor 350 for performing the arbitration processing of an input signal, and a channel register 352 for retaining the channel number 318 of the channel selected by the arbitration processor 350.

The first arbiter 302 receives the demand signals 212 and the address signals 213 corresponding to the demand signals 212 with the same priority level outputted by a plurality of the priority controllers 300. Each first arbiter 302 includes the arbitration processor 350 of a round robin type, for example, and selects one demand signal 212 and address signal 213 out of a plurality of demand signals 212 and address signals 213 without bias.

The arbitration processor 350 outputs one demand signal 212 and address signal 213 selected out of a plurality of demand signals 212 and address signals 213 to the second arbiter 304. The arbitration processor 350 outputs the number of channel of the priority controller 300 which outputted the selected demand signal 212 as the channel number 318. The arbitration processor 350 retains the outputted channel number 318 in the channel register 352. Thus by providing the arbiter for each priority, selection of the demand signals of all priorities may be equalized. As a result, each first arbiter 302 of a round robin type may select one channel from the channel unit 200 outputting the demand signals 212 of the same priority without bias.

When the acknowledgment signal 410 showing that the demand signal 212 has been received from the second arbiter 304, the arbitration processor 350 refers to the channel number 318 retained in the channel register 352. The arbitration processor 350 outputs the acknowledgment signal 410 to the priority controller 300 corresponding to the referred channel number 318. By retaining the channel number 318 corresponding to the demand signal 212 in the channel register 352, the arbitration processor 350 may transmit the acknowledgment signal 410 to the channel which outputted the demand signal 212.

Figure 8:
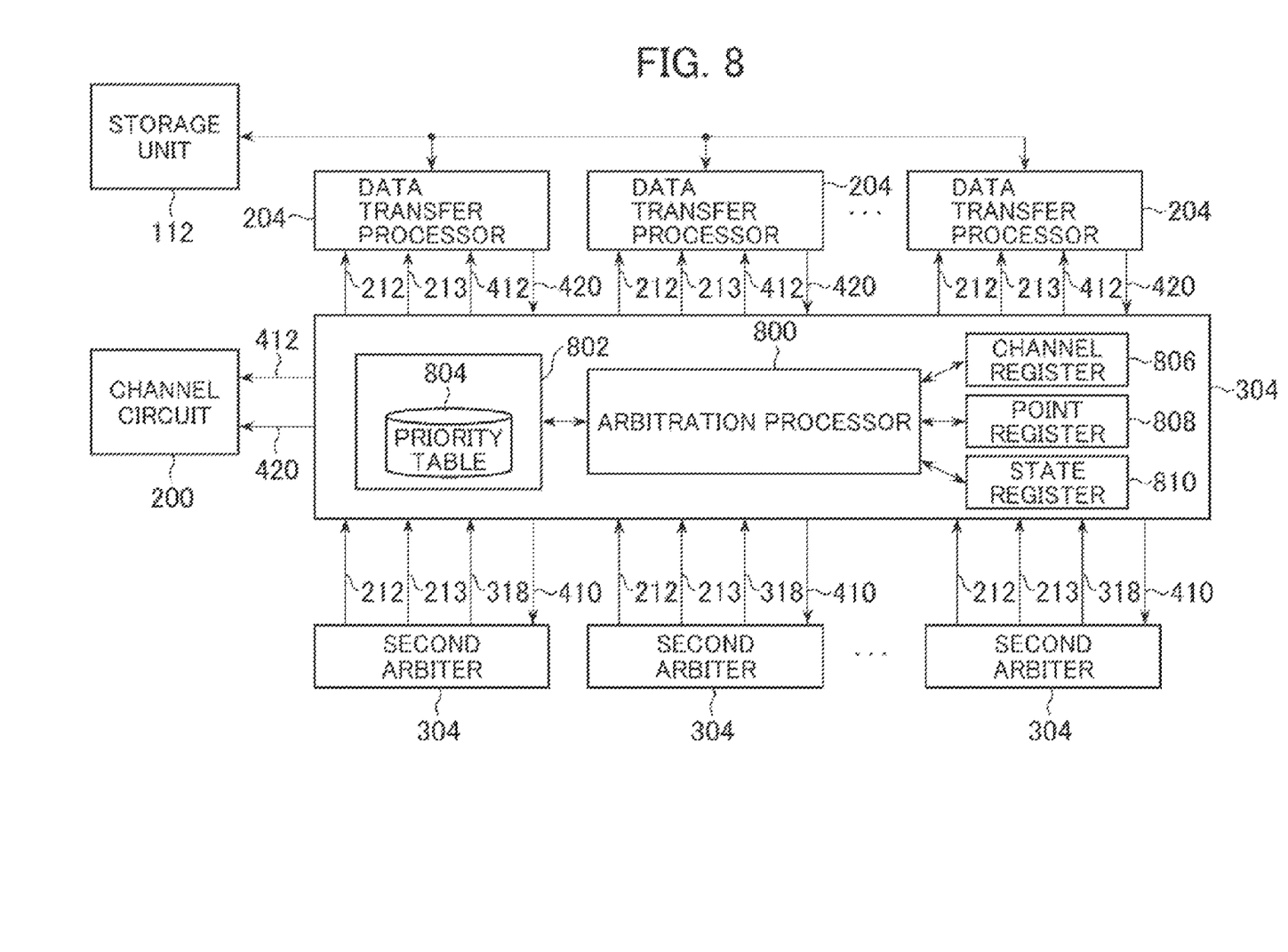
FIG. 8 illustrates a block diagram of a second arbiter.

FIG. 8 is a block diagram of the second arbiter 304 for arbitrating the demand signals 212 outputted by each first arbiter 302 in accordance with priority.

The second arbiter 304 includes an arbitration processor 800, a table register 802, a channel register 806, a pointer register 808, and a state register 810. The table register 802 stores a priority table 804. The channel register 806 stores the channel number 318 corresponding to the demand signal 212 received by the data transfer processor 204. The state register 810 stores the processing condition in the data transfer processor 204. The second arbiter 304 receives the demand signal 212, the address signal 213, and the channel number 318 outputted by the k first arbiters 302.

The arbitration processor 800 refers to the priority table 804 stored in the table register 802 which is a correspondence table between the pointer value and priority. The arbitration processor 800 transmits the demand signal 212 and the address signal 213 corresponding to the priority determined by the priority table 804 to any one of the data transfer processor 204 wherein the processing is finished. The arbitration processor 800 stores the channel number 318 corresponding to the demand signal 212 transmitted to each data transfer processor 204 in the channel register 806. The arbitration processor 800 stores a flag showing that the data transfer processor 204 which received the demand signal 212 is performing processing in the state register 810. The arbitration processor 800 stores a pointer value used when the priority is referred to from the priority table 804 in the pointer register 808.

The data transfer processor 204 executes data transfer processing with reference to the command of the storage unit 112 on the basis of the address signal 213. When the processing is finished, the data transfer processor 204 outputs the state signal 412 showing whether the processing succeeded or failed and the end signal 420 showing the processing finished to the second arbiter 304. When the end signal 220 is received, the arbitration processor 800 stores a flag showing that the processing of the data transfer processor 204 finished in the state register 810. The arbitration processor 800 refers to the channel number 318 corresponding to the demand signal 212 stored in the channel register 806 and outputs the state signal 412 and the end signal 420 to the channel unit 200 corresponding to the demand signal 212. On the basis of the state signal 412 and the end signal 420, the second arbiter 304 may notify each channel unit 200 that the data transfer processing finished and of the result of the data transfer processing.

Figure 9:
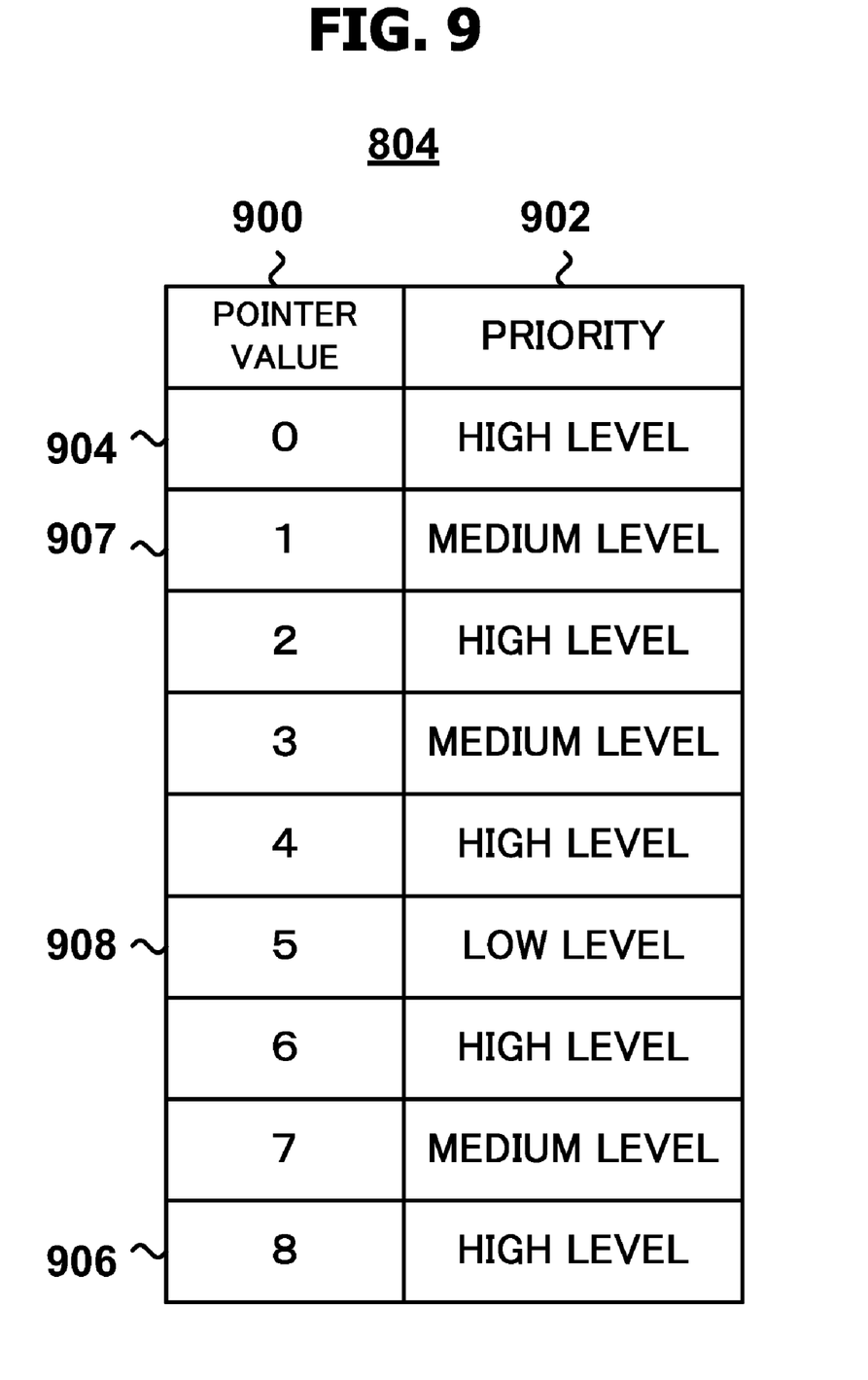
FIG. 9 illustrates a drawing of a priority table.

FIG. 9 is the priority table 804 to which the arbitration processor 800 refers. A selecting order is defined on the priority table 804. In the priority table 804, the column 900 represents the pointer value stored in the pointer register 808, and the column 902 represents the priority corresponding to the pointer value. In the present embodiment, the priority table 804 has 9 lines of data. Out of the data of 9 lines, 5 lines are high level commands, 3 lines are medium level commands and one line is a low level command. By assigning the priorities corresponding to the pointer values so that those of the high level become large, it is possible to perform setting so that the commands of the high level are selected so as to be those of the highest percentage and the commands of the low level are selected so as to be those of the lowest percentage, if the priorities are set in the arbitration processor 800 referring to the priority table 804 from the first line thereof in order. In the case of the present embodiment, the percentage of the commands that are selected and are of the high level is approximately 56%, and the percentage of the commands that are selected and are of the low level is approximately 11%. The percentage of each level may be set on the basis of waiting time of the leading DMA transfer instruction in each of the channel units 200.

The line 904 is the data of the first line of the priority table 804. In the line 904, the priority corresponding to the pointer value "0" is set as the high level. This means that when the pointer value retained in the pointer register 808 is "0", the arbitration processor 800 selects the demand signal 212 and the like from the first arbiter 302 corresponding to the command of the high level, and transmits them to the data transfer processor 204.

The line 907 is the data of the second line of the priority table 804. In the line 907, the priority corresponding to the pointer value "1" is set as the medium level. This means that when the pointer value retained in the pointer register 808 is "1", the arbitration processor 800 selects the demand signal 212 and the like from the first arbiter 302 corresponding to the command of the medium level, and transmits them to the data transfer processor 204.

The line 908 is the data of the fourth line of the priority table 804. In the line 908, the priority corresponding to the pointer value "5" is set as the low level. This means that when the pointer value retained in the pointer register 808 is "5", the arbitration processor 800 selects the demand signal 212 and the like from the first arbiter 302 corresponding to the command of the low level, and transmits them to the data transfer processor 204.

The line 906 is the data of the ninth line, which is the last line, of the priority table 804. After the line 906 is referred to, the arbitration processor 800 refers to the priority to be selected next from the line 904 again which is the first line. The number of lines and the priority set for each line of the priority table 804 may be rewritten from outside. Thus, the priority table may be rewritten so that the number of commands retained in each channel unit 200 is not biased, and optimal assignment of priority in accordance with waiting time may be achieved.

Figure 10:
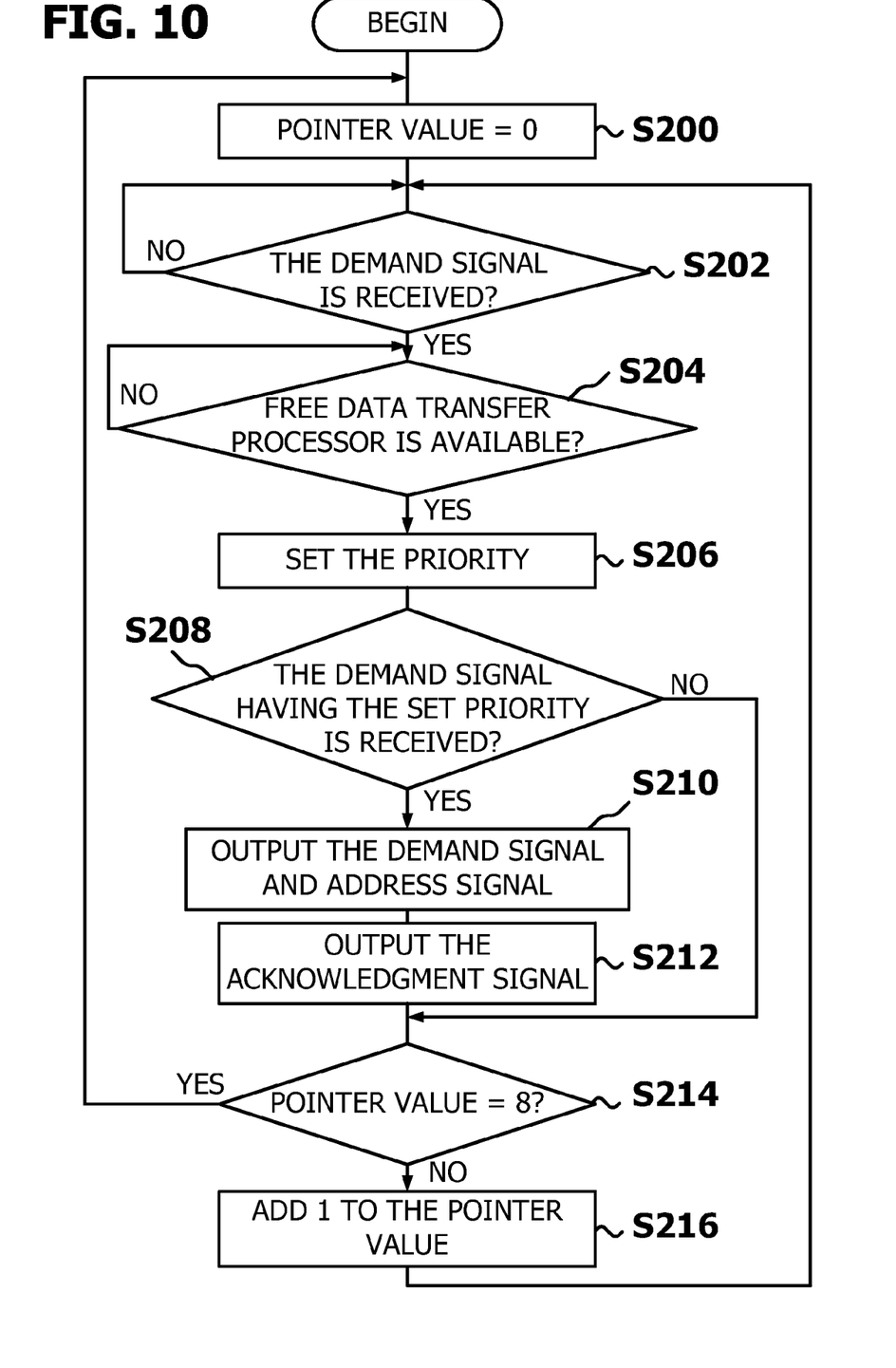
FIG. 10 illustrates an operation flowchart of an arbitration processor.

FIG. 10 is an operation flowchart of the arbitration processor 800. The arbitration processor 800 makes the value of the pointer retained in the pointer register 808 "0" (S200). The arbitration processor 800 is in the state of waiting (S202: NO) until the demand signal 212 is received from any one of the individual first arbiters 302, and proceeds to the step S204 when the demand signal 212 is received (S202: YES).

The arbitration processor 800 refers to the state register 810, and if there is no data transfer processor 204 not executing transfer processing, it enters the state of waiting (S204: NO) until any transfer processing is finished. When there is one of the data transfer processors 204 which has finished the transfer processing (S204: YES), the priority corresponding to the pointer value of the pointer register 808 is read out from the priority table 804 and is set (S206). For example, if the pointer value is "0", the arbitration processor 800 refers to the line 904 of the priority table 804 and sets the priority at the high level.

The arbitration processor 800 checks whether or not a demand signal 315j outputted by the first arbiter 302 corresponding to the priority set in the step S206 has been received, and if not, processing of the step S214 is executed (S208: NO). When the demand signal 212 outputted by respective first arbiter 302 corresponding to the set priority has been received (S208: YES), the arbitration processor 800 transmits the demand signal 212 and corresponding address signal 213 to the data transfer processor 204 (S210). At the same time the arbitration processor 800 stores the channel number 318 corresponding to the demand signal 212 in the channel register 806 corresponding to the data transfer processor 204. Further, the arbitration processor 800 changes the flag of the state register 810 to the state showing that the data transfer processor 204 is performing processing.

The arbitration processor 800 outputs the acknowledgment signal 410 in order to notify each channel unit 200 of the fact that the demand signal 212 was outputted (S212) to the data transfer processor 204. If the pointer value of the pointer register 808 is "8" (S214: YES), the arbitration processor 800 makes the pointer value "0" (S200). If the pointer value of the pointer register 808 is not "8" (S214: NO), the arbitration processor 800 adds "1" to the pointer value of the pointer register 808 (S216). After the addition processing of the pointer value, the arbitration processor 800 repeats the processes of the step S202 thereafter.

By the operations described above, the arbitration processor 800 may grasp the state of processing of each data transfer processor 204, and may make each data transfer processor 204 execute data transfer processing effectively.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A data transfer device for performing direct memory access transfer of data stored in a storage unit to other devices, the data transfer device comprising:
   a plurality of channel units arranged to correspond to the other devices, wherein the channel units that retain direct memory access transfer instructions, and output a number of the direct memory access transfer instructions retained;
   priority controllers that determine first priorities of the channel units on the basis of the number of the direct memory access transfer instructions retained in the channel units, respectively;
   an arbiter that selects one of the direct memory access transfer instructions retained in one of the channel units on the basis of the first priorities determined by the priority controllers; and
   a data transfer processor that performs direct memory access transfer of data stored in the storage unit to one of the other devices in accordance with the direct memory access transfer instruction selected by the arbiter;
   wherein
   the arbiter is arranged to correspond to the first priorities being determined on the priority controllers, the arbiter including a plurality of arbiters,
   the arbiter comprises
      first arbiters that select one of the other devices being determined a second priority in predetermined order, the second priority being one of the first priorities,
      second arbiters that select one of the other devices selected by the first arbiters in accordance with the first priorities except for the second priority,
      the second arbiters output an end signal to a target channel unit, the end signal indicating that the direct memory access transfer of data in the data transfer processor finishes, and
   the target channel unit stops a demand of performing the direct memory access transfer instruction until the target channel unit receives the end signal.

2. The device of claim 1, wherein
   the priority controller determines the first priorities of each of the channel units on the basis of the number of the direct memory access transfer instructions and waiting time of the leading direct memory access transfer instruction in each of the channel units.

3. The data transfer device of claim 1, wherein
   at least one of the second arbiters comprises
   a table register to store first priorities information arranged a selection order of the other devices in accordance with the first priorities, and
   an arbitration processor to select the other devices on the basis of the first priorities information.

4. The data transfer device of claim 1, further comprising:
   a status register to store the status of the data transfer processor.

5. The data transfer device of claim 1, wherein
   the priority controller comprises a threshold value register that stores at least one threshold value to judge the first priorities.

6. A data transfer method of a data transfer device that performs direct memory access transfer of data stored in a storage unit to a plurality of other devices, the data transfer method comprising:
- retaining direct memory access transfer instructions corresponding to the other devices;
- determining first priorities of the direct memory access transfer instructions to the other devices on the basis of the number of the direct memory access transfer instructions retained, respectively;
- selecting one of the other devices that performs direct memory access transfer on the basis of the first priorities determined; and
- performing direct memory access transfer of data stored in the storage unit to one of the other devices selected;
- selecting one of the other devices being determined a second priority in predetermined order, the second priority being one of the first priorities;
- selecting one of the other devices that performs direct memory access transfer in accordance with the first priorities except for the second priority of the device selected;
- outputting an end signal to a target channel unit, the end signal indicating that the direct memory access transfer of data in the data transfer processor finishes; and
- stopping a demand of performing the direct memory access transfer instruction until the target channel unit receives the end signal.

7. The method of claim 6, wherein the determining is performed by determining the first priorities of each of the direct memory access transfer instructions on the basis of the number of the direct memory access transfer instructions retained and waiting time of the leading direct memory access transfer instruction.

8. The data transfer method of claim 6, wherein selecting the other device in accordance with the first priorities performs on the basis of the first priorities information being determined a selecting order of the other devices.

* * * * *